US005775793A

United States Patent [19]

Schmidt et al.

[11] Patent Number: 5,775,793

[45] Date of Patent: Jul. 7, 1998

[54] HEADLIGHT FOR VEHICLES

[75] Inventors: Hans-Joachim Schmidt, Dusslingen; Horst Haenel, Reutlingen; Georg Ebinger, Kusterdingen; Giancarlo Chiarmonte, Mössingen-Belsen, all of Germany

[73] Assignee: Robert Bosch GmbH, Stuttgart, Germany

[21] Appl. No.: 552,578

[22] Filed: Nov. 3, 1995

Related U.S. Application Data

[63] Continuation of Ser. No. 264,437, Jun. 23, 1994.

[30] Foreign Application Priority Data

Jun. 23, 1993 [DE] Germany .......................... 43 23 991.9

[51] Int. Cl.[6] ........................................ B60Q 1/04

[52] U.S. Cl. .......................... 362/61; 362/285; 362/429

[58] Field of Search .......................... 362/61, 285, 418, 362/429, 430, 232, 250

[56] References Cited

U.S. PATENT DOCUMENTS

| | | | |
|---|---|---|---|
| 3,963,916 | 6/1976 | Morton | 362/429 |
| 4,013,335 | 3/1977 | Värkoni et al. | 439/611 |
| 4,682,294 | 7/1987 | Freudenreich et al. | 362/61 |
| 5,032,966 | 7/1991 | Maurer | 362/429 |
| 5,115,381 | 5/1992 | Van Heeswijk | 362/61 |
| 5,221,137 | 6/1993 | Lovelace et al. | 362/61 |

FOREIGN PATENT DOCUMENTS

| | | |
|---|---|---|
| 0 292 200 | 11/1988 | European Pat. Off. . |
| 8908906 | 1/1991 | France . |
| 2850165 | 4/1980 | Germany . |

*Primary Examiner*—Y. My Quach
*Attorney, Agent, or Firm*—Michael Striker

[57] ABSTRACT

A headlight for vehicles has a reflector having at least two regions formed for different illumination functions, at least one light source associated with each of the regions of the reflector and having two light source elements, a lamp carrier fixed to the reflector, one of the light source elements being inserted in the reflector via the lamp carrier and held in the lamp carrier, the lamp carrier having a first portion fixed to the reflector and a second portion in which the one light source element is held, the second portion of the lamp carrier with the one light source element held in it being movable transverse to an optical axis of the reflector relative to the first portion of the lamp carrier for adjusting of the one light source element when the second portion is fixed to the reflector, the second portion of the lamp carrier being accessible from a backside of the reflector for moving the second portion relative to the first portion of the lamp carrier.

3 Claims, 3 Drawing Sheets

HEADLIGHT FOR VEHICLES

This is a continuation of application Ser. No. 08/264,437 filed Jun. 23, 1994.

BACKGROUND OF THE INVENTION

The present invention relates to a headlight for vehicles.

More particularly, it relates to a headlight which has a reflector with at least one light source and a lamp carrier mounted on the reflector.

Headlights of the above mentioned general type are known in the art. One of such headlights is disclosed in the German reference DE 28 50 165 A1. The headlight has a reflector with a light source formed as an incandescent lamp and mounted on a lamp carrier. The lamp carrier is mounted on the reflector and the incandescent lamp is held in the lamp carrier in their mounting position required for a correct orientation of a light beam produced by the headlight, and also for example fixed by a spring bracket. This headlight operates as an anti-dazzle headlight or as a combined anti-dazzle light and high beam headlight, and only one light source is arranged in its reflector. In headlights which are used for several illumination functions, for example for the anti-dazzle light and the high beam light, separate light sources are required for performing different illumination functions. The reflector is therefore formed as a part performing different illumination functions by associated regions. Both for the anti-dazzle light and also for the fog light, a bright-dark limit must be provided in accordance with regulations, whose position must be exactly maintained due to the dazzling danger for the counter-traffic. Due to manufacturing tolerances in both the reflector and the light sources, the light source can assume not always identical positions relative to the reflector and as a result the position of the bright dark limit of the anti-dazzle and fog light beam is not correct. For adjusting the position of the bright-dark limit the reflector can be turned in the headlight. However, the reflector can be turned only as a unit. Adjustment of regions associated with the illuminating functions of anti-dazzle light and fog light is not possible independently from one another and is very expensive to provide.

SUMMARY OF THE INVENTION

Accordingly, it is an object of the present invention to provide a headlight for vehicles of the above mentioned type, which avoids the disadvantages of the prior art.

In keeping with these objects and with others which will become apparent hereinafter, one feature of the present invention resides, briefly stated, in a headlight in which the reflector has at least two regions for different illumination functions and each region is associated with a light source, wherein at least one light source is inserted via the lamp carrier, and the light source held in the lamp carrier is movable transversely to the optical axis of the reflector region associated with this light source for adjustment purposes.

When the headlight is designed in accordance with the present invention, it has the advantage that by simple movement of the light source the position of the bright-dark limit of the light beam reflected from the light source and the associated region of the reflector can be simply adjusted relative to the position of the bright-dark limit of the light bundle reflected by another region of the reflector associated with another light source.

In accordance with a further feature of the present invention, the lamp carrier for providing the movement of the light source together with the lamp carrier is permanently deformable in portions. With these features an especially simple construction of the lamp carrier is provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
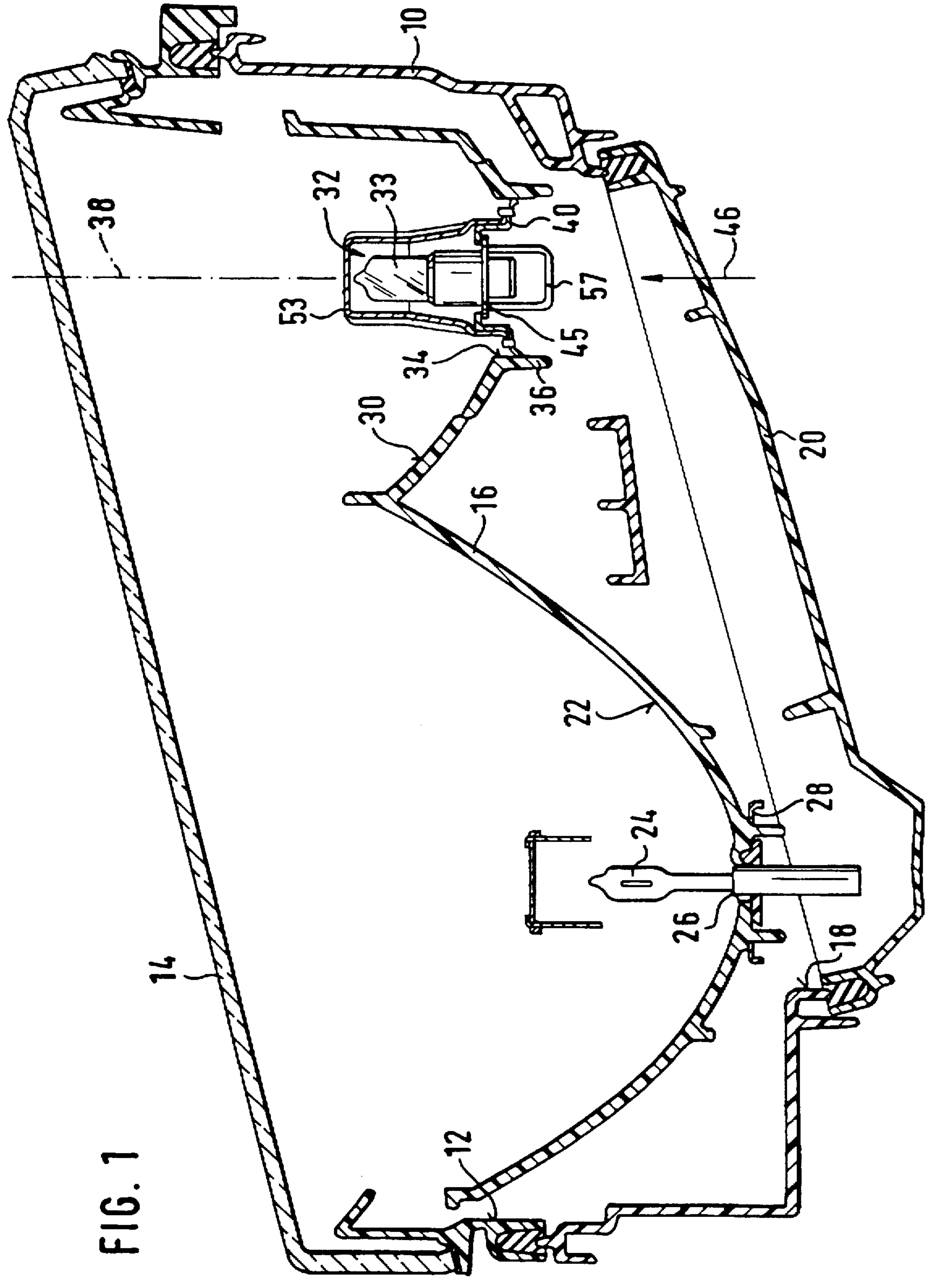
FIG. 1 is a view showing a horizontal axial longitudinal section of a headlight for a vehicle in accordance with the present invention.

A headlight for vehicles, in particular motor vehicles, shown in FIG. 1 has a housing 10 provided with an opening 12 at its front side. A transparent closing disc 14 covers the opening 12. The closing disc 14 can be formed as the clear disc or it can be provided with optically effective elements for influencing light exiting the headlight.

A reflector 16 is adjustably arranged in the housing 10 and is turnable about a horizontal axis and/or a vertical axis. The reflector 16 is formed as a single structural component which has different regions for different illumination functions. The reflector 16 is composed of synthetic plastic material in the shown embodiment. The housing 10 has a further opening 18 at its rear side. Light sources inserted in the reflector 16 are available through the opening 18, and the opening is closeable by a cap 20. In the shown embodiment the reflector 16 has a region 22 for producing an anti-dazzle light bundle, and a light source 24 is associated with the anti-dazzle light region 22. The light source 24 can be formed as an incandescent lamp or a gas discharge lamp. The anti-dazzle light region 22 of the reflector has an opening 26 in its apex region. A lamp carrier 28 with the light source 24 inserted in the opening 26 is mounted on the reflector 16. The light source 24 is received in the lamp carrier 28 and held in it for example by a not shown spring bracket.

The reflector 16 also has a further region 30 for producing a further light beam, for example a fog light beam. The fog light region 30 can be arranged laterally near the anti-dazzle light region 22 or vertically above or below the same. A light source 32 is associated with the fog light region 30 and can be formed as an incandescent lamp or a gas discharge lamp. The fog light region 30 has an opening 34 in its apex region. A collar 36 coaxially surrounds the opening 34 at the rear side of the reflector 16. The fog light region 30 of the reflector 16 has an optical axis 38 extending substantially coaxially to the opening 34. A lamp carrier 40 is arranged in the opening 34 and receives the light source 32.

Figure 2:
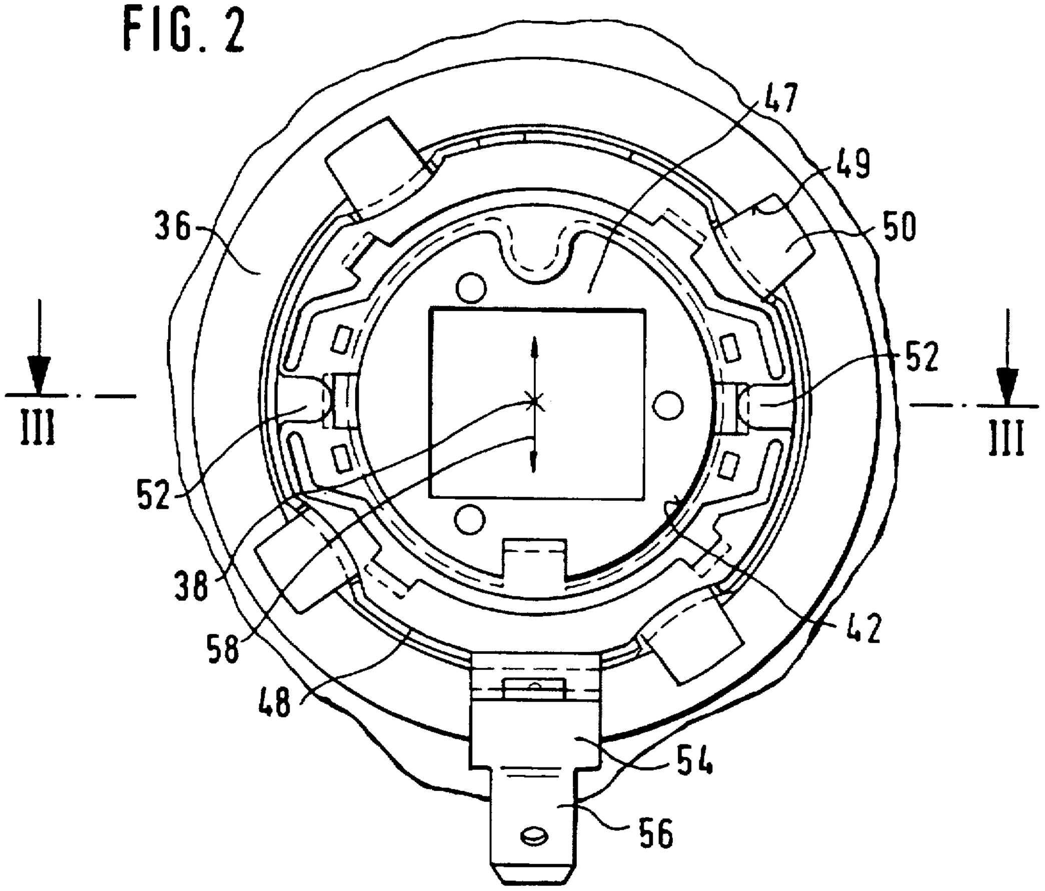
FIG. 2 is a view showing a portion of the inventive headlight as seen in direction of the arrow 46 in FIG. 1, with a first embodiment of a lamp carrier.
Figure 3:
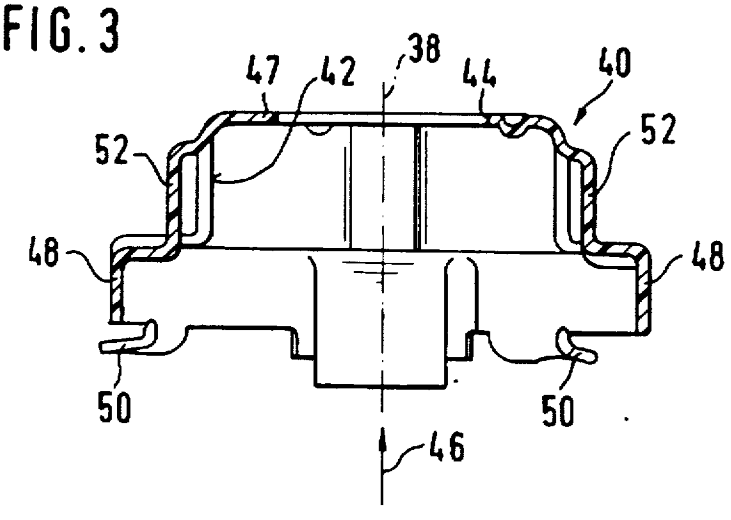
FIG. 3 is a view showing a section of the lamp carrier taken along the line III—III in FIG. 2.

In the first embodiment shown in FIGS. 1–3, the lamp carrier 40 of the fog light region 30 has a cup-shaped portion 42 provided with an opening 44 for passing a glass bulb 33 of the light source 32 extending in the fog light region 30 of the reflector 16. The light source 32 has a base 45 which abuts in its inserting direction 46 against the bottom 47 of the portion 42. The cup-shaped portion 42 is formed so that the light source 32 can be inserted only in a predetermined turning position in it. The cup-shaped portion 42 of the lamp carrier 40 extends substantially into the fog light region 30 of the reflector 16. The lamp carrier 40 has also a ring-shaped portion 48 mounted on the reflector 16. At the edge of the opening 34, four radial recesses 49 are distributed over its periphery and the ring-shaped portion 48 of the lamp carrier 40 has correspondingly four radially extending arms 50 engaging in the recesses 49. The arms 50 are radially elastically deformable, so that during insertion of the lamp carrier in the direction of the arrow 46 they can turn substantially toward the central axis of the opening 34 and in the end position of the lamp carrier 40 engage in the recesses 49 so as to hold the lamp carrier 40 on the reflector 16. The arms 50 of the ring-shaped portion 48 of the lamp carrier 40 can be formed so that they can be hooked or gripped in the recesses 49.

The ring-shaped portion 48 of the lamp carrier 40 is offset relative to its cup-shaped portion 42 opposite to the insertion direction 46 and connected with the cup-shaped portion 42 by two webs 52. However, only one web or more than two webs can be provided. In this embodiment the both webs 42 are arranged substantially in a horizontal plane diametrically opposite to one another. It is also possible to arrange the webs 52 vertically over one another or in any other way over the periphery of the lamp carrier 40. The webs 52 have such a cross-section that they can be formed under the action of a certain force, however, they do not deform under the own weight of the lamp carrier 40 and inserted light source 32. The lamp carrier 40 is composed of a plastically deformable material and is formed for example as a metal sheet part. The cup-shaped portion 42 and the ring-shaped portion 48 as well as the webs 52 connected with them are formed of one piece with one another. A radiation shutter 53 formed as a separate part can be mounted on the lamp carrier 40. It screens the light emitted by the light source 32 directly to the covering disc 14.

The mounting of the lamp carrier 40 and the light source 32 as well as an adjustment of the position of the light source is described hereinbelow. The lamp carrier 40 is inserted in the opening 34 in the reflector 16, and held by the arms 50 engaging in the recesses 49. In the end position a flange 54 bent outwardly radially on the ring-shaped portion 48 abuts against the end of the collar 36 which faces opposite to the insertion direction 46. Therefore, the lamp 40 can not be inserted further into the reflector 16. In this embodiment the flange 54 is formed only over a part of the periphery of the ring-shaped portion 48, and a plug connection 56 for a ground contact is formed on it. The light source 32 is subsequently inserted in the lamp carrier 40 mounted on the reflector 16, and in particular in the cup-shaped portion 42. The light source 32 is not shown in FIGS. 2 and 3 for better visibility. The light source 32 is inserted in the direction of the arrow 46 until its base 45 abuts against the bottom 47 of the cup-shaped portion 42. The light source 32 can be inserted only in a predetermined rotary direction of the lamp carrier 40, so that its light body assumes the correct position relative to the reflector 16. Moreover, the light source 32 can be held in the lamp carrier 40 with a minimum play transversely to its optical axis 38. Then a spring bracket 57 supported with its end region on the ring-shaped portion 48 is turned over the base 45 of the light source 32 and presses the base against the bottom 47. The other end region of the spring bracket 57 is suspended in this position on the portion 48 on the lamp carrier 40, so that the light source 32 is fixed in its position.

Since in view of tolerances the light source 32 not always assumes the exactly identical position relative to the fog light region 30 of the reflector 16, the fog light beam reflected from the fog light region 30 not always is emitted in the prescribed direction. In particular, the bright-dark limit of the fog light beam not always assumes the required position. For adjusting the position of the bright-dark limit of the fog light beam, the cup-shaped portion 42 of the lamp carrier 40 is movable with the light source 32 inserted in it relative to the ring-shaped portion 48 mounted on the reflector 16, transversely to the optical axis 38, in particular in a perpendicular direction relative to the double arrow 58. For this purpose the cup-shaped portion 42 is engaged by a suitable tool, for example a lever and the portion 42 is moved until the bright-dark limit assumes the required position. The portion 42 is permanently deformed, so that the cup-shaped portion 42, together with the light source held in it permanently assumes its new position. It is possible to tilt the cup-shaped portion 42 relative to the ring-shaped portion 48 or to move only perpendicularly relative to the optical axis 38.

Figure 4:
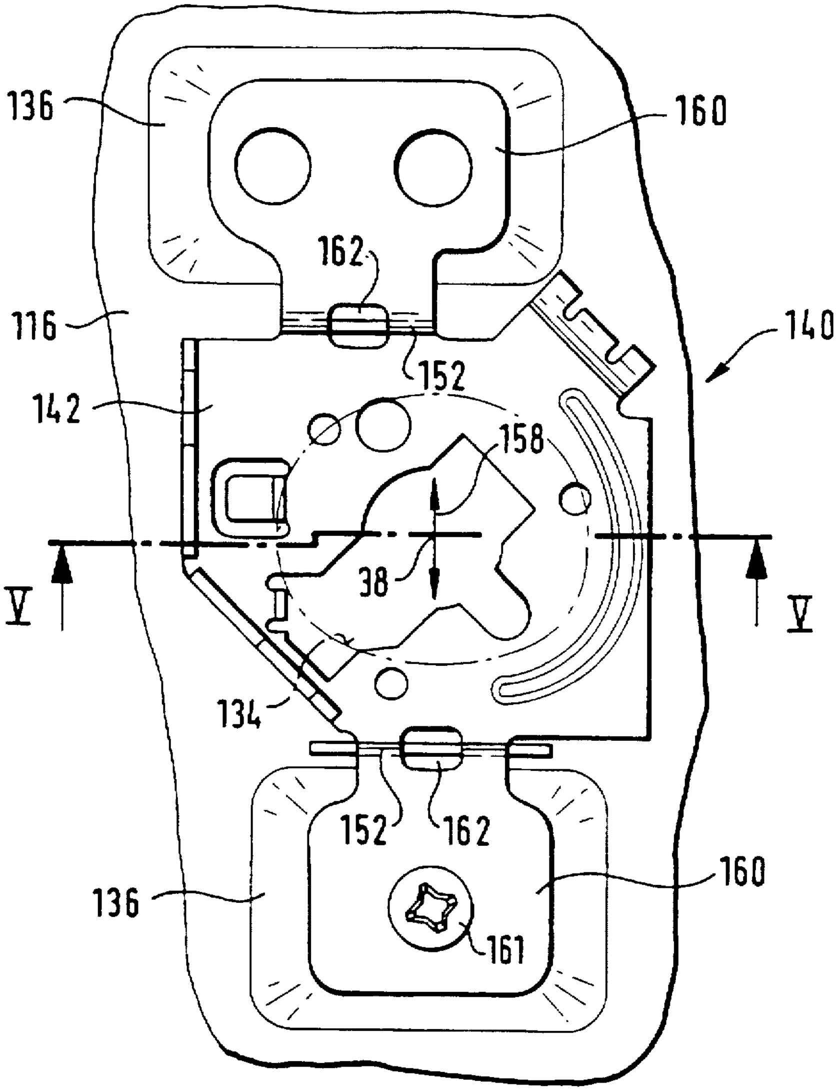
FIG. 4 is a view showing a portion of the headlight with the lamp carrier in accordance with the second embodiment of the present invention.
Figure 5:
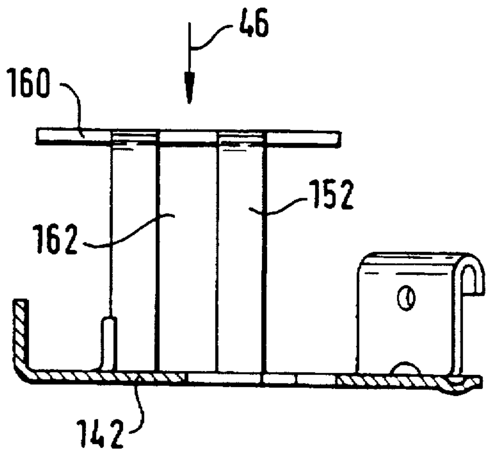
FIG. 5 is a view showing the lamp carrier of FIG. 4 in a section taken along the line V—V in FIG. 4.

In a second embodiment shown in FIGS. 4 and 5, only those features which are different from the first embodiment are described. The reflector 116 has an opening 134 for passing the light source. Domes 136 are arranged above and below the opening 134 and extend from the rear side of the reflector 116. The lamp carrier 140 is composed of a plastically deformable material and is formed in particular as a metal sheet part. The lamp carrier 140 has two feet 160 which are mounted by screws 161 on the ends 155 of the domes 136 facing away of the insertion direction 46. Both feet 160 are connected by a web 152 with a bottom part 142 which receives the light source 32. The bottom part 142 is remote from the foot 160 in the insertion direction 46 and arranged at a small distance from the rear side of the reflector 116 and at a distance from the inner sides of the domes 136 facing the optical axis 38. Therefore, a movement of the bottom part 142 relative to the reflector 116 between the domes 136 is possible.

The webs 152 extend substantially parallel or somewhat inclined relative to the center axis or optical axis 38 of the fog light region 130 of the reflector 116 and have a flat cross-section with a small extension located in a vertical direction. Both webs 152 are arranged substantially vertically over one another and can be offset somewhat in a horizontal direction. The light source 32 is held in the bottom part 142 of the lamp carrier 40 by a not shown spring bracket. The webs 152 each have an opening 162 through which a suitable tool, for example a screwdriver, can be inserted.

During the mounting of the lamp carrier 140 the lamp carrier with its bottom part 142 is inserted between the domes 136 until the feet 160 sit on the ends of the domes 136 and then the screws 136 are arranged. The light source 132 is inserted in the bottom part 142 until its base abuts in the insertion direction 146 on the bottom part 142. The light source 32 can be inserted only in a predetermined rotary position in the lamp carrier 140 and held in the lamp carrier 140 with a minimum play transverse to the optical axis 38. In this position the light source 32 is held by a not shown spring bracket. For adjusting the position of the bright-dark limit of the fog light beam reflected by the fog light region 30 of the reflector 116, a screwdriver is inserted through the opening 162 into one web 152 and engages with its blade the edge of the bottom part 142. The screw driver can be supported on the dome 136 or on the feet 160 mounted on the domes 136 so as to form a lever arm. The bottom part 142 can be moved by a movement of the screw driver in the rotary direction 158. Therefore, the web 152 is permanently deformed, or in other words it is deformed plastically, and the bottom part 142 assumes permanently the adjusted position relative to the feet 160. When the screwdriver is inserted through the upper web 152 and engages the upper edge of the bottom part 142, the bottom part 142 can be moved downwardly, and correspondingly the bottom part 142 can be moved upwardly by engaging on its lower edge.

It will be understood that each of the elements described above, or two or more together, may also find a useful application in other types of constructions differing from the types described above.

While the invention has been illustrated and described as embodied in a headlight for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for vehicles, comprising a reflector having at least two regions formed for different illumination functions; at least two light sources associated correspondingly with said regions of said reflector and having two light source elements; a lamp carrier fixed to said reflector, one of said light source elements being inserted in said reflector via said lamp carrier and held in said lamp carrier, said lamp carrier having a first portion fixed to said reflector and a second portion in which said one light source element is held, said second portion of said lamp carrier with said one light source element held in it being movable transverse to an optical axis of said reflector relative to said first portion of said lamp carrier for adjusting of said one light source element when said first portion is fixed to said reflector and said one light source element is held in said second portion of said lamp carrier, said second portion of said lamp carrier being accessible from a backside of said reflector for moving said second portion relative to said first portion of said lamp carrier after and when the lamp carrier with said one light source element are inside said reflector, so that a position of said one light source element in said reflector can be adjusted after said lamp carrier has been fixed on said reflector and said one light source element is held in said lamp carrier.

2. A headlight as defined in claim 1, wherein said second portion of said lamp carrier on which said light source element is held is offset relative to said first portion of said lamp carrier which is mounted on the reflector, in direction of an optical axis.

3. A headlight for vehicles, comprising a reflector having at least two regions formed for different illumination functions; at least two light sources associated correspondingly with said regions of said reflector and having two light source elements; a first lamp carrier fixed to said reflector in one of said regions of said reflector, one of said light source elements being inserted in said reflector via said first lamp carrier and held in said first lamp carrier; a second lamp carrier having a first portion fixed to said reflector in another of said regions and a second portion in which another light source element is held, said second portion of said second lamp carrier with said another light source element held in it being movable transverse to an optical axis of said reflector relative to said first portion of said second lamp carrier for adjusting of said another light source element when said first portion of said second lamp carrier is fixed to said reflector and said another light source element is held in said second lamp carrier, said second portion of said second lamp carrier being accessible from a back side of said reflector for moving said second portion relative to said first portion of said second lamp carrier after and when said second lamp carrier with said another light source element are inside said reflector, so that a position of said another light source element in said reflector can be adjusted after said second lamp carrier has been fixed on said reflector in said another region and said another light source element is held in said second lamp carrier.

* * * * *